L. E. CADWELL.
TIRE SUPPORT.
APPLICATION FILED MAR. 3, 1913.
1,072,909.
Patented Sept. 9, 1913.
2 SHEETS—SHEET 2.
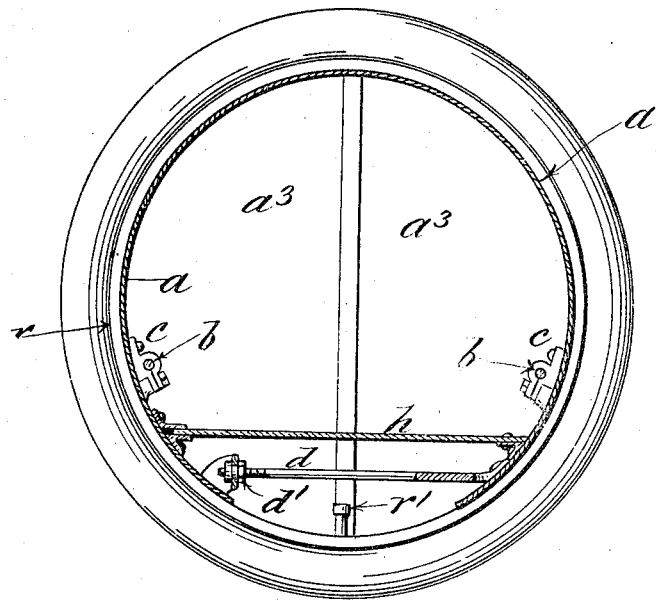
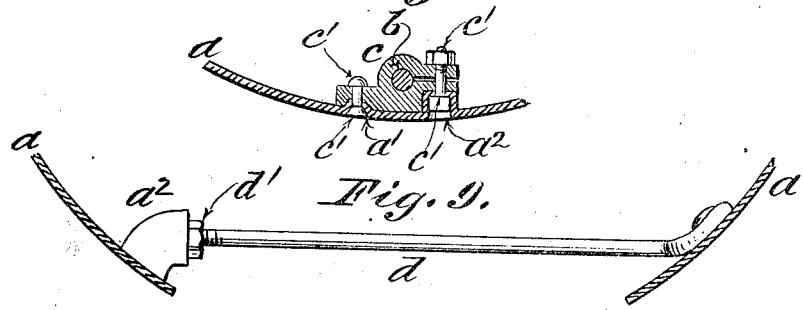

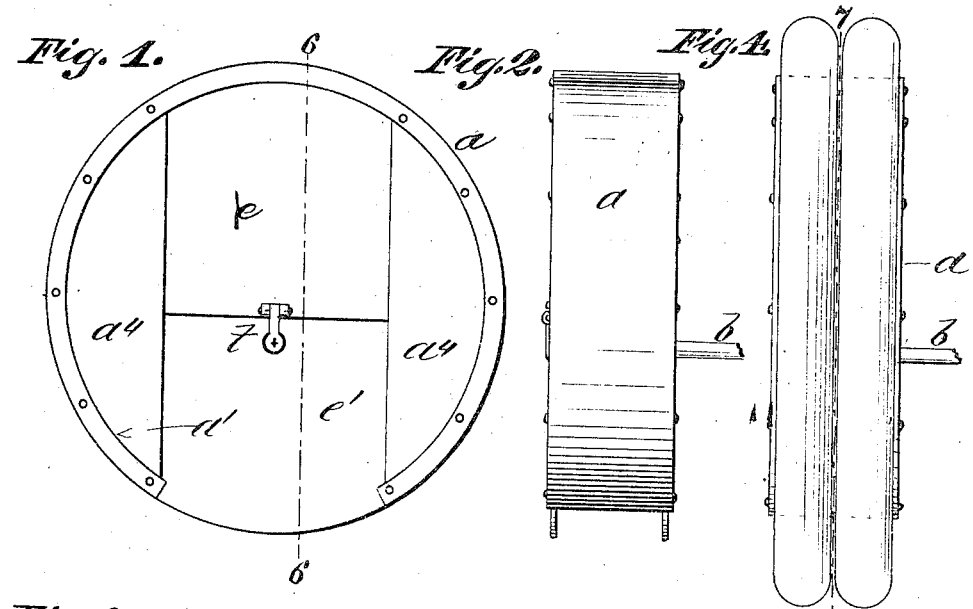
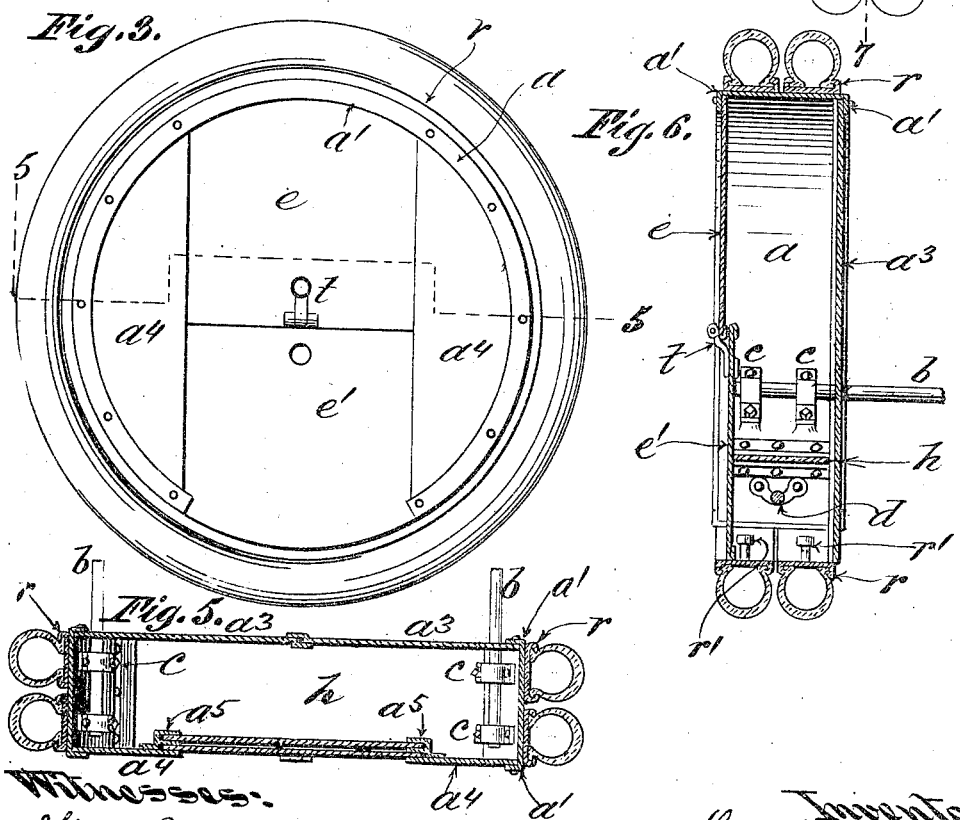

UNITED STATES PATENT OFFICE.

LOUIS E. CADWELL, OF NEW YORK, N. Y.

TIRE-SUPPORT.

1,072,909.  Specification of Letters Patent.  Patented Sept. 9, 1913.

Application filed March 3, 1913. Serial No. 751,859.

*To all whom it may concern:*

Be it known that I, LOUIS E. CADWELL, a citizen of the United States, and a resident of the borough of Manhattan, city, county, and State of New York, have invented certain new and useful Improvements in Tire-Supports, of which the following is a specification.

My improvements relate to supports for automobile tires, particularly those known as demountable rim tires, the object being to afford simple but effective means for securing such tires firmly in position upon the support, and to utilize the area inclosed by said support.

To this end the invention consists in the specific construction and arrangement of parts described and claimed, a distinctive feature being the use of an expansible drum section over and upon the peripheral surface of which a demountable rim tire may be fitted, and secured or released as required, the invention also including certain incidental features hereinafter fully set forth.

In the accompanying drawings, Figure 1, is a front elevation of my improved tire support; Fig. 2, a side elevation of the same; Fig. 3, a front elevation of my tire support, showing a demountable rim tire in position thereon; Fig. 4, a side elevation of my tire support with two tires in position; Fig. 5, is a horizontal section taken upon line 5—5 Fig. 3; Fig. 6, a vertical section taken upon line 6—6 Fig. 1; Fig. 7, is a sectional view taken upon line 7—7 Fig. 4; Fig. 8 is a sectional detail of one of the bracket clamps; Figs. 9 and 10, are respectively side and top views of means of ad40 justment adapted for use in connection with my expansible drum section.

The fundamental or basic member of my demountable rim tire holder or support is the expansible drum section $a$. This is es45 sentially and in its simplest form a cylindrical plate of, say, approximately five sixths circumferential extension, the other one sixth representing the space between the two ends of the plate, which is sup50 ported on brackets $b$, $b$, protruding from any suitable support, as may be found expedient. As applied to automobiles I prefer to attach the brackets $b$, $b$, to the frame or chassis of the machine, although this is not an essential matter. The brackets $b$, $b$, the forward rod-like ends or arms only of which are shown in the drawings, are secured to the expansible drum $a$, by any suitable means, as by clamps $c$, $c$, and said bracket arms afford sufficient elasticity and resilience to enable them to yield to the adjustment of the expansible drum $a$, the extent of such adjustment being comparatively slight and not more than one fourth of an inch even at the ends of the drum plate.

In order to afford a smooth uniform peripheral surface on the drum $a$, for the accommodation of a demountable rim $r$, of a tire, I prefer to secure the clamps $c$, $c$, to the inner side of the drum plate $a$, as shown in Fig. 8, the metal of the plate being inset to form sockets $a'$, $a^2$, for the reception of the heads of the bolts $c'$, $c'$, which heads are thus practically countersunk in the drum plate $a$. This construction not only leaves an unobstructed peripheral drum surface, but it enables me to substitute a bolt or nut when necessary without discarding or mutilating the clamp itself.

The drum section $a$, is expanded or contracted sufficiently to clamp or release a demountable rim tire placed thereon by any suitable and well known mechanical expedient, as by the use of the coupling rod $d$, rigidly secured to one extremity of the drum plate $a$, and adjustably secured to the other extremity of the said plate by means of a swivel nut $d'$, mounted on a bracket $a^2$, on the plate $a$, and engaging with the threaded end of the coupling rod $d$, as shown more particularly in Figs. 9 and 10 of the drawings. By this or equivalent means of adjustment the drum plate $a$, may be readily expanded sufficiently to tightly fit and firmly secure a demountable rim tire positioned thereon, or quickly contracted to release said tire. In this connection it may be noted that the drum plate is preferably made wide enough to accommodate two demountable rim tires, and hence by merely tightening or loosening the swivel nut $d'$, upon the coupling rod $d$, both tires may be secured or released. The space below the coupling rod $d$, and between the ends of the drum plate $a$, affords ample and unobstructed accommodation for the usual air nipples $r'$, $r'$, of the tire, as will be seen by reference to Figs. 6 and 7 particularly.

Even when released by the contraction of the drum $a$, the demountable rim tire is supported thereon, and maintained in convenient position for handling and removal; and when secured to the drum $a$, by the expansion of the latter so that its peripheral surface binds tightly against the inner surface of the demountable rim $r$, the tire is held rigidly in position, so that there is no vibration or loose play of parts to wear and deteriorate the tire, its cover &c., not to mention the elimination of rattle and noise.

Obviously my expandable tire-supporting drum $a$, may be used without accessories other than those hereinbefore set forth, but I prefer to utilize the area circumscribed by the drum plate $a$, as a receptacle for various articles, and to this end I form the drum plate $a$, with inturned edge flanges $a'$, $a'$, to which are attached back plates $a^3$, $a^3$, and front plates $a^4$, $a^4$. The back plates $a^3$, $a^3$, are offset to overlap at their opposed edges, as indicated in Fig. 5, or otherwise made to allow and compensate for the slight movement involved in the adjustment of the drum plate $a$, by means of the coupling rod $d$, and nut $d'$. Between the vertical edges of the front plates $a^4$, $a^4$, are mounted sliding doors $e$, $e'$, the vertical edges of which rest in grooves formed by angle plates $a^5$, $a^5$, (shown in Fig. 5) on the vertical edges of the front plates $a^4$, $a^4$, said grooves being of sufficient depth to allow for the adjustment of the drum plate. The lower door $e'$, when raised, gives access to the swivel nut $d'$, &c., for the purpose of effecting the expansion or contraction of the drum plate; and the upper door $e$, when lowered, gives access to the inclosed space above the shelf $h$, which is situated above the coupling rod $d$, and connections. This shelf $h$, may be rigidly supported on one side of the drum plate $a$, and slidably supported on the other side thereof, as shown more particularly in Fig. 7, so as not to interfere with the adjustment of the drum plate; and it affords a convenient support for articles suitable to be stored within the receptacle thus created without in the least impairing the function of the drum plate as a positive means for rigidly supporting one or more demountable rim tires, or releasing them for use.

The doors $e$, $e'$, may be secured in their closed relation to each other by locking means, as by the use of what is known as a trunk lock $t$, indicated in Figs. 1, 3 and 6.

I am aware that independent circular trunks have been inserted in tires otherwise supported, but such are not the equivalent of my unitary demountable rim tire holder and receptacle, of which latter the adjustable drum plate forms a component part,—and the other parts of the receptacle being adapted to conform to the movement of the drum plate as hereinbefore set forth. Furthermore my expandable and contractable drum plate is a most simple but effective device for effecting the rigid support of one or more demountable rim tires and attaining the quick and convenient release thereof when desired, a few turns of the swivel nut $d'$, being sufficient for either purpose. It practically eliminates vibration, the chafing of retaining straps, tire covers, &c., and adds materially to the comfort and convenience of automobilists.

By the use of the term drum plate herein it is to be understood that I mean an approximately cylindrical structure of less than full circumference, having free ends opposed to each other below the axial center of the structure,—or in other words, an approximately annular plate the ends of which are separated to a certain extent.

The incasing of the expansible drum plate, and the locking of the inclosing doors perform another important function in that the tires are thereby safeguarded against surreptitious removal since they cannot be loosened or detached until the doors are unlocked.

What I claim as my invention and desire to secure by Letters Patent is,

1. A support for demountable rim tires comprising a drum plate, the free ends of which are united by means by which the drum may be expanded to bind against the inner surface of the detachable rim, or contracted to release the said rim.

2. A support for demountable rim tires consisting of an approximately annular drum plate, and means for expanding and contracting the same to bind or release the rim positioned thereon.

3. A support for demountable rim tires comprising an expandable and contractable drum plate, means for expanding and contracting the same, back plates attached to said drum plate and formed with overlapping and contacting edges, front plates attached to said drum plate, and doors slidable between said front plates, for the purpose described.

4. A support for demountable rim tires comprising an expandable and contractable drum plate, means for expanding and contracting the same, back plates attached to said drum plate and formed with overlapping and contacting edges, front plates attached to said drum plate, and doors slidable between said front plates, and a shelf rigidly attached to one side of the drum plate and slidably attached to the other side of said drum plate, for the purpose described.

5. A support for demountable rim tires consisting of an approximately annular drum plate and means for expanding and contracting the same to bind or release the rim positioned thereon, comprising a threaded coupling link attached to one side of the drum plate and engaging with a swivel nut mounted on the other side of the drum plate, and including said swivel nut, for the purpose described.

LOUIS E. CADWELL.

Witnesses:
 GEO. WM. MIATT,
 LILLIA MIATT.